(12) United States Patent
Davis et al.

(10) Patent No.: US 6,233,326 B1
(45) Date of Patent: May 15, 2001

(54) METHOD AND APPARATUS FOR IDENTIFYING A LINE BLOCKAGE

(75) Inventors: Ted Jeffery Davis, O'Fallon; Michael Grady Jackson, St. Louis, both of MO (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/128,182

(22) Filed: Aug. 3, 1998

(51) Int. Cl.$^7$ ................................................. H04M 15/00
(52) U.S. Cl. ............................ 379/111; 379/134; 379/164
(58) Field of Search .................... 379/113, 114, 379/134, 164, 111, 112, 133, 137, 377, 383

(56) References Cited

U.S. PATENT DOCUMENTS

| | | | |
|---|---|---|---|
| 5,081,671 | * | 1/1992 | Raith et al. ............................ 455/452 |
| 5,230,017 | * | 7/1993 | Alexander ............................ 379/140 |
| 5,684,868 | * | 11/1997 | Alexander ........................ 379/113 X |
| 5,825,769 | * | 10/1998 | O'Reilly et al. .............. 379/93.23 X |
| 5,896,573 | * | 4/1999 | Yang et al. ........................... 455/453 |
| 5,905,785 | * | 5/1999 | Dunn et al. ................. 379/100.15 X |
| 6,021,191 | * | 2/2000 | Ash et al. ............................ 379/204 |

* cited by examiner

Primary Examiner—Creighton Smith
(74) Attorney, Agent, or Firm—Jack R. Penrod

(57) ABSTRACT

Call blockages can now be identified down to the line and group of lines that caused the call blockage. No more long statistical studies followed by guessing in order to alleviate blockages. This method and apparatus operating in concert with recently added load balancing processes report specifically what caused each call blockage at what time. With such specific information, each line or group of lines that needs to be moved or added to a new line terminating equipment are quickly identified and accomplished, thereby keeping service to the average customers at acceptable levels. The amount of specificity represents a breakthrough in call line and traffic management.

2 Claims, 3 Drawing Sheets

202
PROCESS BALANCE OUTPUT. STRIP OUT ONLY THE CALL BLOCKAGE DATA. THIS DATA CONSISTS OF 4 DATA FIELDS. FIELD 1 CONTAINS DATE/TIME DATA, FIELD 2 CONTAINS BLOCKED DIRECTORY NUMBER, FIELD 3 CONTAINS BLOCKED LINE EQUIPMENT NUMBER (LEN) OF FIELD 2, FIELD 4 CONTAINS THE SWITCH AND LEVEL OF THE FOUR BLOCKING ORIGINATING EQUIPMENT. THE LAST DIGIT OF FIELD 4 INDICATES WHETHER THIS CALL BLOCKAGE WAS AN ORIGINATING OR TERMINATING CALL ATTEMPT.

204
SEPARATE THE CALL BLOCKAGE DATA INTO TWO SEPARATE SETS OF DATA. ONE IS AN A-LINK BLOCKAGE DATA SET, THE OTHER IS A B-LINK BLOCKAGE DATA SET. THIS IS DETERMINED BY EXAMINING FIELD 4. FIELD 4, WHICH HAS NINE DIGITS, IS BROKEN INTO 5 SUBPARTS. THE DATA IS BROKEN APART AS AABBCCDDE. IF THE VALUE OF AA, BB, CC, OR DD EQUALS 82 (THE VALUE 82 IS THE DESIGNATION FOR A B-LINK BLOCKED CALL) THIS CALL BLOCKAGE IS PUT IN THE B-LINK BLOCKAGE DATA SET. ELSE, THE CALL WAS AN A-LINK BLOCKAGE AND IS PUT IN THE A-LINK BLOCKAGE DATA SET. THUS IF AA, BB, CC, OR DD EQUALS 82 GO TO STEP 5, ELSE STEP 3.

AA, BB, CC, OR DD = 82

AA, BB, CC, OR DD ≠ 82

206
PROCESS THE A-LINK BLOCKAGE DATA TO CREATE THE FOUR BLOCKING LINE EQUIPMENT NUMBERS (LENs) FOR EACH BLOCKAGE. THIS IS DONE BY COLLECTING DIGITS 1-7 ON FIELD 3 THEN ADDING AA FROM FIELD 4 TO GET THE 1st BLOCKING LEN. THE 2nd BLOCKING LEN IS CREATED BY TAKING THE SAME 7 DIGITS FROM FIELD 3 AND ADDING BB FROM FIELD 4. THE SAME IS DONE FOR CC AND DD. THE DATA SET CREATED IS THEN SORTED AND COUNTED AND CREATES A FILE OF EACH UNIQUE BLOCKING LEN AND THE NUMBER OF OCCURRENCES IT CAUSED A BLOCKAGE. THE FILE IS THEN RANK ORDERED WITH THE LEN CAUSING THE MOST BLOCKAGES FIRST. THE WAY THIS DATA IS PRESENTED IS IN VARIOUS REPORTS. ONE PURPOSE OF THESE REPORTS IS THAT THEY IDENTIFY THE INDIVIDUAL LENs CAUSING THE MOST BLOCKAGES.

METHOD AND APPARATUS FOR IDENTIFYING A LINE BLOCKAGE

FIELD OF THE INVENTION

The invention relates to switching systems for telephone services and, more particularly, to a method for locating busy lines that that cause blockages for possible alternative connections.

BACKGROUND OF THE INVENTION

Call blockages force the local switch to make more attempts before an off-hook telephone obtains a dial tone. On a switch with too many blockages, an off-hook telephone may not receive a dial tone at all. A previously known method of determining call and line blockages relied on probability not facts. This previous method used telephone traffic measurement studies, such as those available from TRAFFIC 30 reports, which were based on 30 minute reports. Each report would only provide the one hundred call seconds (CCS) method which measures of telephone traffic load obtained by multiplying the number of calls in an hours by the average holding time per call in seconds & dividing the product by 100. Using this type of report, the maximum possible CCS that can be handled by 1 circuit in 1 hour is 36. However, the CCS is a usage statistic, it is not a measure of whether or not a line is involved in a call a blockage. By operation of the theory that the most busy line is most likely to cause the most call blockages, the busiest line or lines were moved to other trunk groups or other switching modules to alleviate blockages. Typically, to get meaningful information, TRAFFIC 30 reports for days even months are gathered for statistical analysis. But even then, not all of the lines experiencing blockages will be found because of the imprecision of statistical techniques. Further, often by the time the sample data has been accumulated, calling patterns and blocking patterns have changed, leaving the data stale and the actions taken on the data potentially ineffective.

It is an object of the present invention to provide a method and apparatus to determine blockage of actual lines from data, not just statistical probabilities.

It is another object of the invention to provide a method and apparatus that can locate actual blockages in a few hours instead of the many days that were previously required to get a probable answer.

SUMMARY OF THE INVENTION

Briefly stated, in accordance with one aspect of the invention, the foregoing objects are achieved by providing a method that obtains and processes data concerning individual call blockages not just probabilities. Until very recently this data was not reported, but a new software reports, such as Balance by Lucent Technologies, make data about actual call blockage data. Additionally, the method determines if the majority of the blockages are caused by a single line or a larger subset of lines.

In a specific embodiment, the foregoing objects are achieved by providing a method for processing call blockage data which includes the steps of stripping a plurality of data fields out of the processing call blockage data; separating the call blockage data fields into two separate sets of data designated as an A-Link blockage data set and as a B-Link Blockage data set; said separation into the A-Link data set and the B-Link data set is performed according to values of a link blockage data field of said plurality of data fields; processing the A-Link Blockage data to create four blocking line equipment numbers (LENs) for each blockage; processing the A-Link Blockage data again only using a first set of 7 digits of field 3 creating a data set created that is subsequently sorted and counted to create a file of each unique hardware group of 64 LENs referred to as a blocking line unit grid; processing the B-Link Blockage data again using a first 5 digits of Field 3 creating a data set that is subsequently sorted and counted to create a file of each unique blocking line unit; checking all blockage data to determine if any hardware outages caused any of the blockages; and presenting all blockages in chronological order by LEN number and also in chronological order by Directory Number. With this method besides identification of individual call blockage lines, call blockage lines are identified in groups larger than one and any hardware outage contributing to a call blockages is also identified.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying drawings in which:

FIGS. 2A and 2B together form a sequence diagram illustrating steps of a call blockage line identification method.

DETAILED DESCRIPTION

Figure 1:
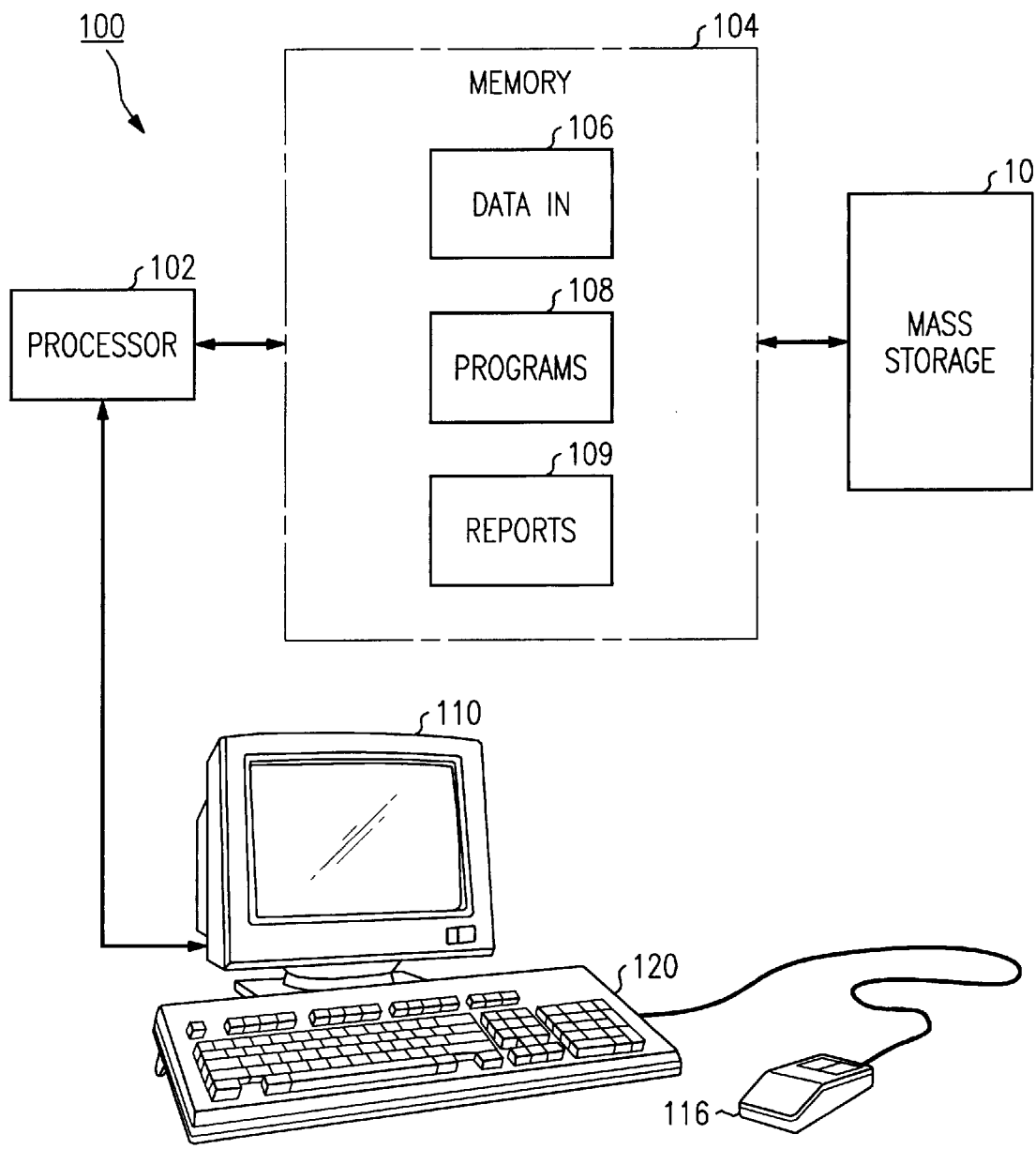
FIG. 1 is a block diagram showing a computer connected to a local communications switch.

Referring now to FIG. 1, a computer system 100 is shown connected to a local communication switch 10. Computer 100 in a preferred embodiment is a work station which operates with a UNIX® operating system, UNIX is a register trademark of UNIX Systems Labs, although an IBM compatible personal computer and operating system is contemplated. Computer 100 is connected to and receives data from a local communication switch 10, which in a preferred embodiment is a No. 5ESS®, 5ESS is a registered trademark of Lucent Technologies Inc., Murray Hill, N. J. Local switch 10 provides a load balancing process, such as BALANCE™ by Lucent Technologies, Inc., that records call blockage data in an output file. BALANCE has only been publicly available since Jul. 22, 1998, so data detailed enough to single out a single blockage or set of blockages were not available before that date.

Call blockages can occur for a number of reasons. A common problem occurs when the local switch 10 connects to its local analog lines via a concentrator (not shown). Concentrators assume that the analog telephone lines attached thereto will be used for short telephone calls lasting approximately five minutes each. As long as the calls are randomly spaced eight to one concentration, a macro form of time sharing a telephone line, ratio may be used. However, close friends and internet users break down the short message random usage telephone call model and if there are enough of them, such calls can block other calls vying for a line out of a concentrator. Too many long time duration telephone calls on a concentrator means a long time before a customer gets a dial tone, or sometimes a customer wanting to make a call cannot get a dial tone, i.e. is blocked, because all the lines out of the concentrator are taken at the moment. It can work the other way also, if all lines from the switch to the concentrator are occupied, then a call that must go through that concentrator in order to complete or terminate a call is blocked. Detailed information about such blockages has not been readily available, but recent load balancing processes, such as BALANCE, collect details of such blockages in files, and these files can be accessed by systems such as computer 100 for analysis.

Computer 100 receives the data from a load balancing process and stores the load balancing data 106 within memory 104. Computer 100 then uses memory stored programs 108 to read, analyze and store results of the load balancing data 106. One new line identification service processing program called HotSpot™, HotSpot is a trademark of Lucent Technologies Inc., for analyzing load balancing data 106 is shown in FIGS. 2A and 2B.

Figure 2B:
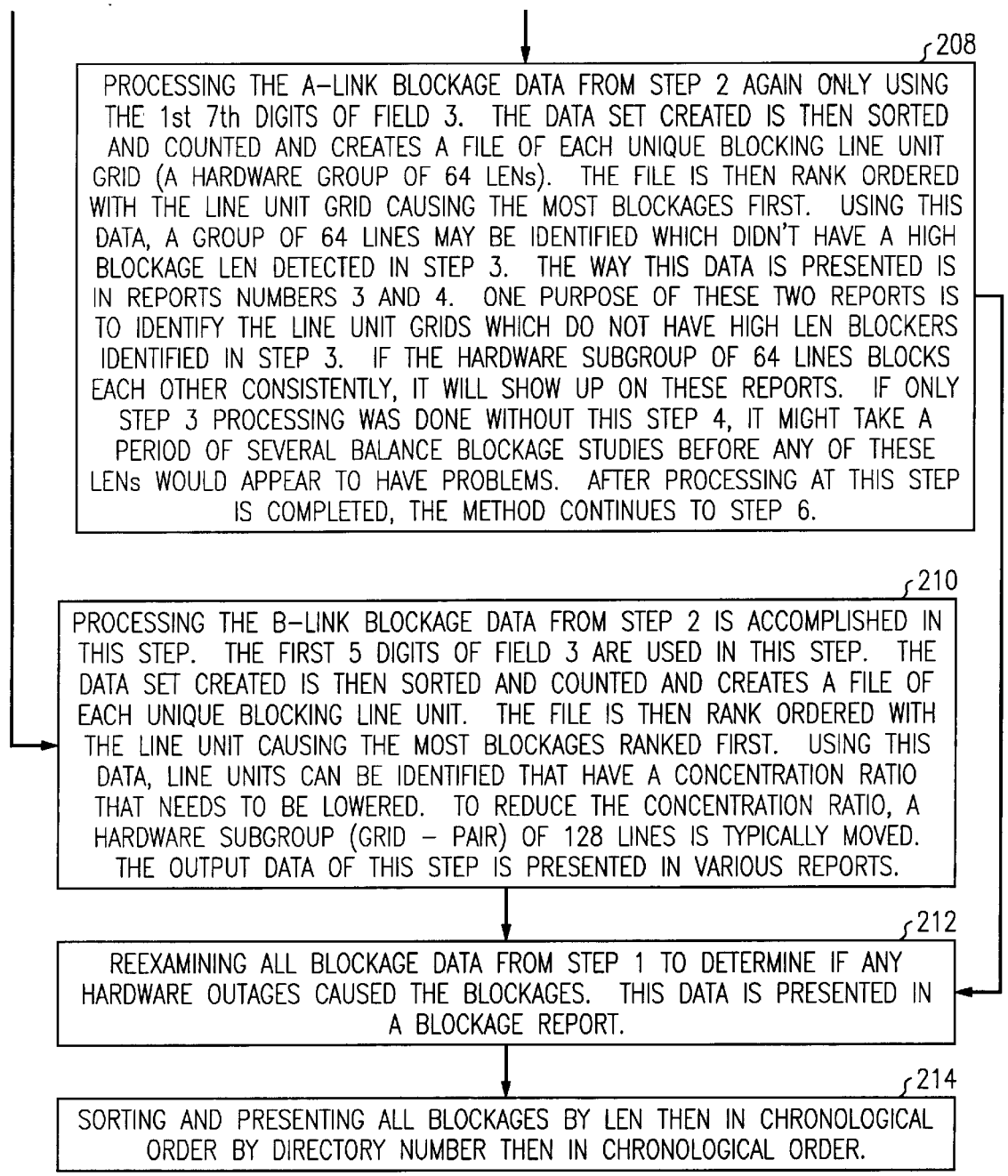

Referring now to FIGS. 2A and 2B, a line identification service processing method 200 will be described. Method 200 can quickly find and report individual lines that are causing call blockages as well as find and report certain groups of lines that taken together are causing call blockages.

The first step 202 of method 200 is a processing of the load balancing data 106. Step 202 strips out only the call blockage data. This call blockage data consists of four data fields: Field 1 contains date and time of day data, Field 2 contains Blocked Directory Number data, Field 3 contains Blocked Line Equipment Number (LEN) of field 2 data and Field 4 contains the Switch and Level of the four Blocking Originating Equipment. The last digit of field 4 indicates whether this call blockage was an originating or terminating call attempt. In many ways Field 4 contains the more part of the information that is processed.

Next, at step 204 method 200 separates the processed call blockage data into two separate sets of data. One set is an A-Link blockage data set, the other is a B-Liik Blockage data set. Separation into one of the two sets is determined by examining Field 4. Field 4 is broken into 5 subparts. Field 4 is 9 digits long. The data is broken apart as AABBCCDDE. If the value of AA, BB, CC, or DD equals 82 (This is the designation for a B-Link Blocked Call) this call blockage is put in the B-Link blockage data set and continues to step 210. Otherwise, the call was an A-Link Blockage and is put in the A-Link Blockage data set and continues to step 206.

At step 206, method 200 processes the A-Link Blockage data to create the 4 Blocking LENs for each Blockage. This is done by collecting digits 1–7 of field 3 then adding AA from Field 4 to get the $1^{st}$ Blocking LEN. Then the $2^{nd}$ Blocking LEN is created by taking the same 7 digits from field 3 and adding BB from Field 4. The $3^{rd}$ and $4^{th}$ Blocking LENs are produced in same way by adding CC and DD, respectively. The data set created is then sorted and counted and gathered into a file with each unique Blocking LEN and the number of occurrences of blockage that it caused. The file is then rank ordered with the LEN causing the most blockages first. This data is presented is in Reports 1 and 2 (shown in REPORTS 109 of FIG. 1). The purpose of these two reports is to identify the individual LENs causing the most blockages.

Next, step 208 processes the A-Link Blockage data from step 204 again only using the $1^{st}$ 7 digits of Field 3. The data set created by this processing is then sorted and counted and gathered into a file of each having unique Blocking Line Unit Grid (a hardware group of 64 LENs). The file is then rank ordered with the Line Unit Grid causing the most blockages ranked first. Using this data, a group of 64 lines may be identified which didn't have a high blockage LEN detected by step 206. This data is presented in Reports 3 and 4. The purpose of these two reports is to identify the Line Unit Grids which do not have high LEN Blockers identified in step 206. Since the hardware subgroup of 64 Lines is blocking each other consistently, it will show up on this report. If only step 206 processing was done without step 208 processing, several periods of Balance Blockage studies could go by before any of these LENs would appear to as problems. From step 208, method 200 proceeds to step 212.

At step 210, method 200 processes the B-Link Blockage data from step 204. In this step 210, for each call blockage the first 5 digits of Field 3 are collected as a data set. The data set is then sorted and counted and gathered into a file for each unique Blocking Line Unit. The file is then rank ordered with the Line Unit causing the most blockages ranked first. Using this data, Line Units can be identified where the concentration ratio of the Line Unit needs to be lowered. To reduce the concentration ratio, a hardware subgroup (Grid-pair) of 128 lines is moved. Without step 210, it would take a period of time (4–8 weeks) to study call traffic to identify Line Units which exceed the CCS engineered capacity. Since such traffic measurements are labor intensive, such a measurement is usually done only as a last resort. The processed data from step 210 is presented as Reports 5 and 6.

At step 212, method 200 reexamines all Blockage data from step 1 to determine if any hardware outages were the causes of the call blockage(s). This data of hardware outage induced call blockages is presented as Report 11. Step 212 and its related report are intended to prevent moving call blocking LENs which were only identified in Reports 1–6 but were caused by an over concentration from a hardware outage. Such information has not been available previously.

Next at step 214, sorting and processing all Blockages in chronological order by LEN number (Report 7), all Blockages in chronological order by Directory Number (Report 9), all Blockages by LEN then in chronological order (Report 8) and all Blockages by Directory Number then in chronological order (Report 10). These reports are the final results reported by method 200.

The results of method 200, especially the results reported as part of steps 208, 210 and 212 provide significant advantages and advances over the previous art in identifying lines in groups larger than one and whether a hardware outage contributed to the call blockages. Some consider this a breakthrough in call blockage traffic measurement and management.

Thus, it will now be understood that there has been disclosed a method and apparatus for determining specific cause or causes for call blockages. Such determinations are strong candidates for relocation to lower utilized equipment or added equipment. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. A method for processing call blockage data comprising the steps of
   a. stripping a plurality of data fields out of the processing call blockage data;
   b. separating the call blockage data fields into two separate sets of data designated as an A-Link blockage data set and as a B-Link Blockage data set; said separation into the A-Link data set and the B-Link data set is performed according to values of a link blockage data field of said plurality of data fields;

c. processing the A-Link Blockage data to create four blocking line equipment numbers (LENs) for each blockage;

d. processing the A-Link Blockage data from step b. again only using a first set of 7 digits of field 3 creating a data set created that is subsequently sorted and counted to create a file of each unique hardware group of 64 LENs referred to as a blocking line unit grid;

e. processing the B-Link Blockage data from step b. again using a first 5 digits of Field 3 creating a data set that is subsequently sorted and counted to create a file of each unique blocking line unit;

f. checking all blockage data from step a. to determine if any hardware outages caused any of the blockages; and g. presenting all blockages in clironological order by LEN number and also in chronological order by Directory Number;

wherein call blockage lines are identified in groups larger than one and any hardware outage contributing to a call blockages is also identified.

2. An apparatus processing call blockage data comprising:

means for stripping a plurality of data fields out of the processing call blockage data;

means for separating the call blockage data fields into two separate sets of data designated as an A-Link blockage data set and as a B-Link Blockage data set; said separation into the A-Link data set and the B-Link data set is performed according to values of a link blockage data field of said plurality of data fields;

means for processing the A-Link Blockage data to create four blocking line equipment numbers (LENs) for each blockage;

means for processing the A-Link Blockage data from step b. again only using a first set of 7 digits of field 3 creating a data set created that is subsequently sorted and counted to create a file of each unique hardware group of 64 LENs referred to as a blocking line unit grid;

means for processing the B-Link Blockage data from step b. again using a first 5 digits of Field 3 creating a data set that is subsequently sorted and counted to create a file of each unique blocking line unit;

means for checking all blockage data from step a. to determine if any hardware outages caused any of the blockages; and means for presenting all blockages in chronological order by LEN number and also in chronological order by Directory Number;

wherein call blockage lines are identified in groups larger than one and any hardware outage contributing to a call blockages is also identified.

* * * * *